United States Patent
Fujiwara

(10) Patent No.: US 7,945,796 B2
(45) Date of Patent: May 17, 2011

(54) SYSTEM FOR CONTROLLING POWER SUPPLIES TO AN EXTERNAL APPARATUS VIA A CONNECTOR BASED ON USER SETTING INFORMATION

(75) Inventor: Naoki Fujiwara, Akiruno (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 527 days.

(21) Appl. No.: 12/127,730

(22) Filed: May 27, 2008

(65) Prior Publication Data

US 2009/0006874 A1    Jan. 1, 2009

(30) Foreign Application Priority Data

Jun. 29, 2007  (JP) ................................ 2007-172803

(51) Int. Cl.
*G06F 1/26* (2006.01)
(52) U.S. Cl. ........... 713/323; 713/320; 713/324; 710/15
(58) Field of Classification Search .................. 713/320, 713/323, 324; 710/15
See application file for complete search history.

(56) References Cited

U.S. PATENT DOCUMENTS

| | | | |
|---|---|---|---|
| 6,671,814 B1 * | 12/2003 | Kubo et al. | 713/324 |
| 7,024,569 B1 * | 4/2006 | Wright et al. | 713/300 |
| 7,711,970 B2 * | 5/2010 | Keller | 713/323 |
| 2006/0035527 A1 | 2/2006 | Numano | |

FOREIGN PATENT DOCUMENTS

| | | |
|---|---|---|
| JP | 2001117676 | 4/2001 |
| JP | 2006053748 | 2/2006 |
| JP | 2006155024 | 6/2006 |

* cited by examiner

*Primary Examiner* — Thuan N Du
(74) *Attorney, Agent, or Firm* — Blakely, Sokoloff, Taylor & Zafman LLP

(57) ABSTRACT

According to one embodiment, an information processing apparatus includes: an information processing apparatus main body receiving a supply of power from power supplies disposed at outside or inside; one or a plurality of connection connector(s) constituted to be able to attach/detach an external apparatus, and having at least one signal terminal transmitting/receiving signals between the information processing apparatus main body and the external apparatus and at least one power terminal supplying the power from the power supplies to the external apparatus; a power supply state changing portion having a switch provided between the power supply and the power terminal, and capable of changing the switch to either one of a connection state or a non-connection state; and a power supply state control portion having user setting information set by a user concerning a control method of the power supply state changing portion, and performing a control to change the switch to either one of the connection state or the non-connection state in accordance with the user setting information at a non-operation time of the information processing apparatus main body.

10 Claims, 5 Drawing Sheets

Fig.4

USB POWER SUPPLY SETTING SCREEN

| | USB① | USB② | USB③ | USB④ |
|---|---|---|---|---|
| SUPPLY POWER | ☑ | ☑ | ☑ | ☑ |
| SUPPLY POWER FROM BATTERY | ☑ | ☑ | ☐ | ☐ |
| SETTING VALUE OF RESIDUAL CAPACITY WHEN POWER IS SUPPLIED FROM BATTERY | 50% | 10% | — | |
| VALIDATE WAKE-UP FUNCTION | ☑ | ☐ | ☑ | ☑ |
| SET ELECTRIC POTENTIAL OF DATA + AT HIGH VOLTAGE LEVEL | ☐ | ☐ | ☑ | ☑ |
| SET ELECTRIC POTENTIAL OF DATA − AT HIGH VOLTAGE LEVEL | ☐ | ☐ | ☐ | ☐ |

SYSTEM FOR CONTROLLING POWER SUPPLIES TO AN EXTERNAL APPARATUS VIA A CONNECTOR BASED ON USER SETTING INFORMATION

CROSS-REFERENCE TO RELATED APPLICATIONS

This application is based upon and claims the benefit of priority from Japanese Patent Application No. 2007-172803, filed Jun. 29, 2007, the entire contents of which are incorporated herein by reference.

BACKGROUND

1. Field

One embodiment of the invention relates to an information processing apparatus including a connector to attach an external apparatus, and supplying power to the external apparatus via the connector.

2. Description of the Related Art

An example of an information processing apparatus including a connection connector is disclosed in a prior document (Japanese Patent Application Laid-open No. 2006-53748). In this information processing apparatus, the connection connector of the information processing apparatus is connected to an external apparatus, and power is supplied from the information processing apparatus to the external apparatus via the connection connector. The information processing apparatus supplies the power to the external apparatus via the connection connector even when the information processing apparatus shifts from an operation state to a non-operation state.

BRIEF DESCRIPTION OF THE SEVERAL VIEWS OF THE DRAWINGS

A general architecture that implements the various features of the invention will now be described with reference to the drawings. The drawings and the associated descriptions are provided to illustrate embodiments of the invention and not to limit the scope of the invention.

FIG. 4 is an exemplary setting screen to set user setting information in the embodiment.

DETAILED DESCRIPTION

Various embodiments according to the invention will be described hereinafter with reference to the accompanying drawings. In general, according to one embodiment of the invention, an information processing apparatus includes: an information processing apparatus main body receiving a supply of power from power supplies disposed at outside or inside; one or a plurality of connection connector(s) constituted to be able to attach/detach an external apparatus, and having at least one signal terminal transmitting/receiving signals between the information processing apparatus main body and the external apparatus and at least one power terminal supplying the power from the power supplies to the external apparatus; a power supply state changing portion having a switch provided between the power supply and the power terminal, and capable of changing the switch to either one of a connection state or a non-connection state; and a power supply state control portion having user setting information set by a user concerning a control method of the power supply state changing portion, and performing a control to change the switch to either one of the connection state or the non-connection state in accordance with the user setting information at a non-operation time of the information processing apparatus main body.

Figure 1:
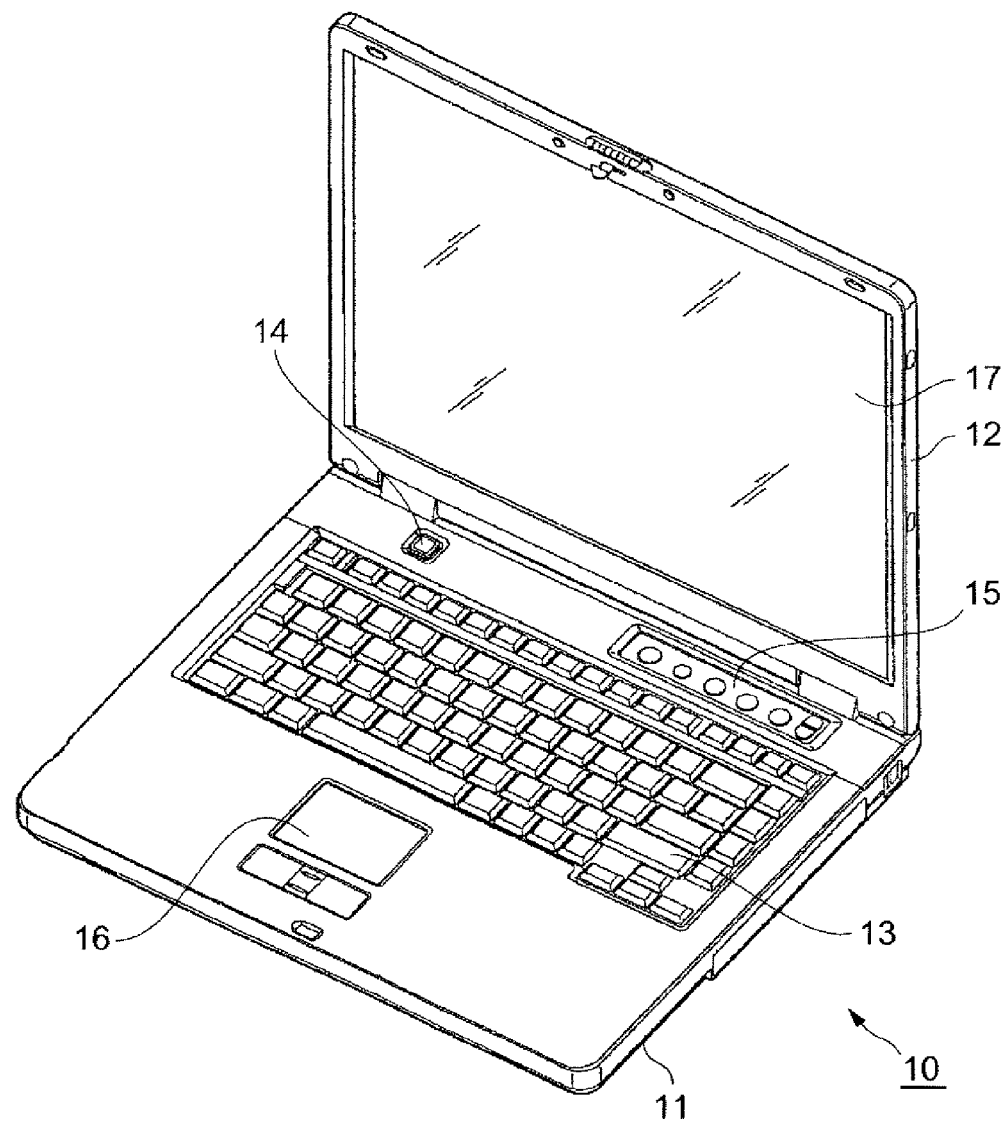
FIG. 1 is an exemplary perspective view showing an external appearance of a personal computer according to the an embodiment of the invention.

As shown in FIG. 1, a notebook type personal computer (information processing apparatus) 10 is constituted by a computer main body 11 and a display unit 12. A display apparatus constituted by an LCD (Liquid Crystal Display) 17 is built in the display unit 12, and a display screen of the LCD 17 is positioned at approximately a center of the display unit 12.

The display unit 12 is attached rotatably between an opened position and a closed position relative to the computer main body 11. The computer main body 11 has a casing in a thin box type, and a keyboard 13, a power button 14 to turn ON/OFF power supply of the personal computer 10, an input operation panel 15, a touch pad 16, and so on are disposed at an upper surface thereof.

Next, a system configuration of the personal computer 10 is described.

Figure 2:
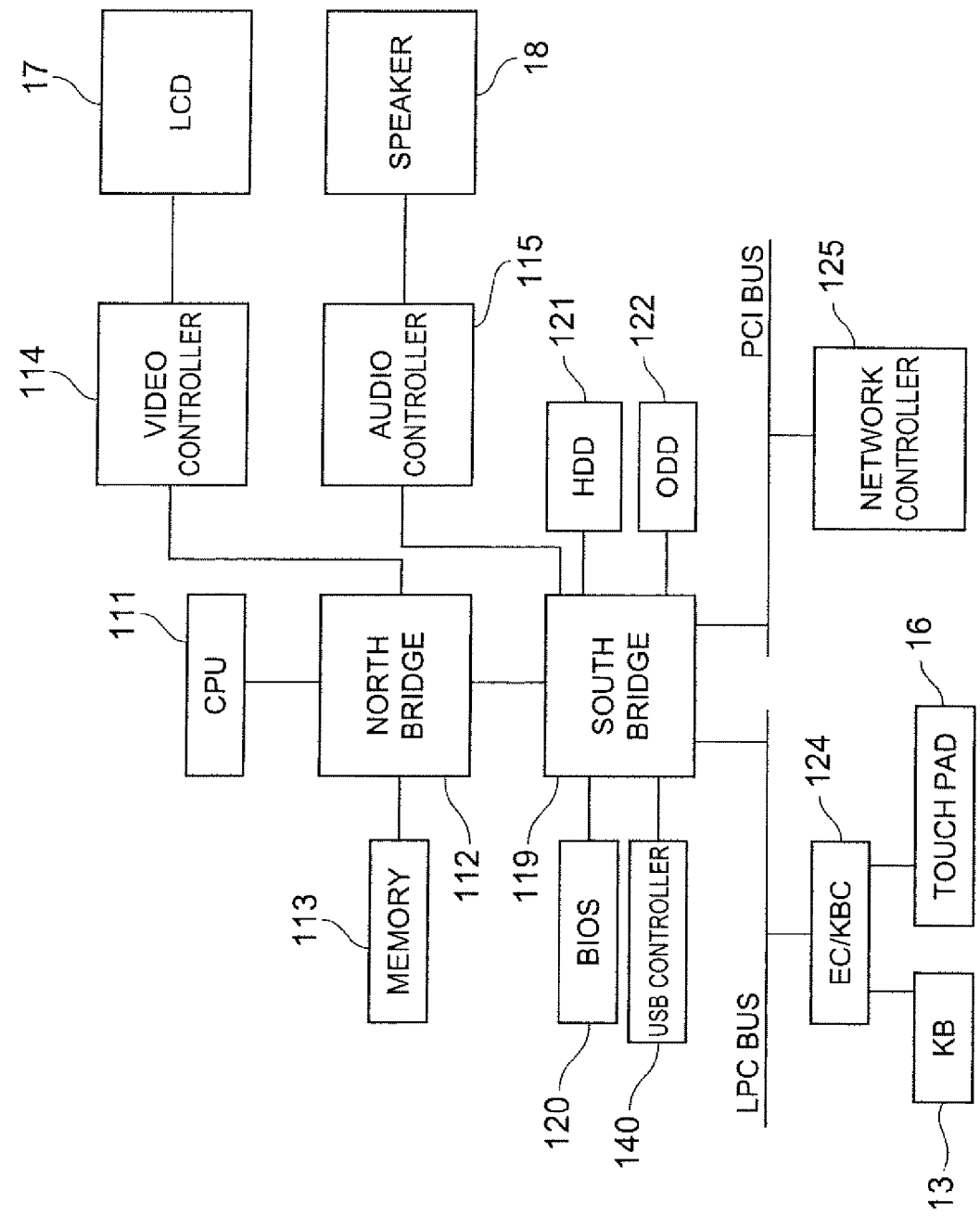
FIG. 2 is an exemplary block diagram showing a system configuration of the personal computer in the embodiment.

As shown in FIG. 2, the personal computer 10 includes a CPU 111, a north bridge 112, a main memory 113, a video controller 114, an audio controller 115, a south bridge 119, a BIOS 120, a hard disk drive (HDD) 121, an optical disk drive (ODD) 122, a USB connector 140, an embedded controller/keyboard controller IC (EC/KBC) 124, a network controller 125, and so on.

The CPU 111 is a processor provided to control operations of the personal computer 10, and executes an operating system (OS) and various application programs loaded from the HDD 121 to the main memory 113. Besides, the CPU 111 also executes a system BIOS (Basic Input Output System) stored in the BIOS 120 being a nonvolatile memory. The system BIOS is a program for hardware control.

The north bridge 112 is a bridge device connecting between a local bus of the CPU 111 and the south bridge 119. A memory controller performing an access control of the main memory 113 is also housed in the north bridge 112. Besides, the north bridge 112 also has a function to perform a communication with the video controller 114 via an AGP (Accelerated Graphics Port) bus and so on.

The video controller 114 is a video reproduction controller controlling the LCD 17 used as a display monitor of the personal computer 10. The video controller 114 generates a reproduction signal to be transmitted to the LCD 17 from decoded video data.

The south bridge 119 controls respective devices on an LPC (Low Pin Count) bus, and respective devices on a PCI (Peripheral Component Interconnect) bus. Besides, the south bridge 119 has a function to perform a communication with the audio controller 115. Besides, the south bridge 119 houses an IDE (Integrated Drive Electronics) controller to control the HDD 121 and the ODD 122. Besides, the south bridge 119 houses a USB host controller to control a USB device connected to the USB connector 140. Further, the south bridge 119 also has a function to perform an access control of the BIOS 120.

The audio controller 115 is an audio reproduction controller controlling a speaker 18 of the personal computer 10. The audio controller 115 generates a reproduction signal to be transmitted to the speaker 18 from decoded audio data.

The HDD 121 is a storage apparatus storing various software and data. The ODD 122 is a drive unit to drive a storage media such as a DVD in which video contents are stored.

The EC/KBC 124 is a one-chip microcomputer in which an embedded controller for power management, and a keyboard controller to control the keyboard (KB) 13 and the touch pad 16 are integrated. This EC/KBC 124 has a function to turn ON/OFF the power supply of the personal computer 10 in accordance with an operation of the power button 14 by a user. The network controller 125 is a communication apparatus to perform a communication with an external network such as, for example, the Internet, and so on.

Figure 3:
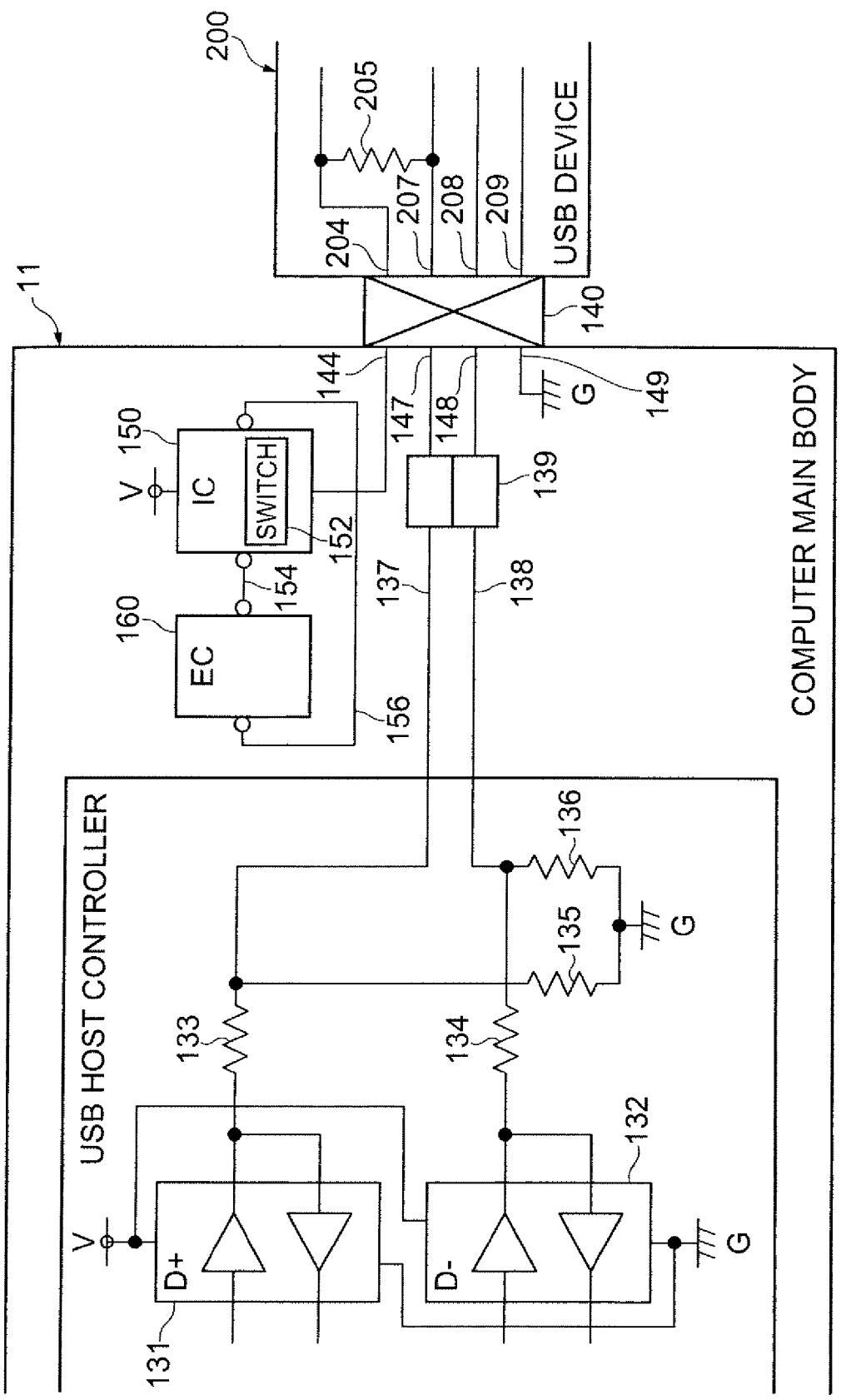
FIG. 3 is an exemplary block diagram showing a connection portion between a computer main body and a USB device in the embodiment.

Next, a connection portion between the computer main body 11 and a USB device 200 is described. FIG. 3 shows a configuration of the connection portion between the computer main body 11 and the USB device 200.

The USB device 200 is an external apparatus complying with a USB (Universal Serial Bus) standard, and it is, for example, a cellular phone, a portable audio player, and so on. The USB device 200 has a USB plug capable of inserting into the USB connector 140, and the USB device 200 is connected to the computer main body 11 by inserting the USB plug into the USB connector 140. The USB plug has two signal terminals 207, 208 to transmit/receive signals between the computer main body 11, a power terminal 204 to receive a supply of power from the computer main body 11 and a ground terminal 209 to ground. Incidentally, a resistance 205 is a pull-up resistance housed in the USB device 200.

The USB connector 140 is a port provided at the computer main body 11 to make the USB device 200 attachable/detachable. The USB connector 140 has two signal terminals 147, 148 to transmit/receive signals between the USB device 200, a power terminal 144 to supply power from a power supply V to the USB device 200 and a ground terminal 149 connected to the casing of the computer main body 11. Only one USB connector 140 is shown in FIG. 3, but plural USB connectors 140 are provided at the computer main body 11. Incidentally, there are the one in which one USB connector 140 is managed as one independent controlled object, and the one in which one set constituted by the plural USB connectors 140 is managed as one independent controlled object among the USB connectors 140, in the control of the personal computer 10.

A USB host controller (an external apparatus control portion) 130 is a circuit to transmit/receive signals such as control commands and data between the USB device 200. The USB host controller 130 has an input/output buffer 131 and a series resistance 133 provided on a positive pole communication line 137, an input/output buffer 132 and a series resistance 134 provided on a negative pole communication line 138, a pull-down resistance 135 connected to the positive pole communication line 137 and a pull-down resistance 136 connected to the negative pole communication line 138. A set of signals generated inside the USB host controller 130 is outputted through the input/output buffers 131, 132, adjusted by a filter 139 being a passive component for an EMI countermeasure and so on, and reaches the signal terminals 147, 148 of the USB connector 140. Incidentally, user setting information set by a user concerning a control method of the communication lines 137, 138 is stored in a memory housed in the USB host controller 130. The USB host controller 130 performs a control of the communication lines 137, 138 in accordance with the user setting information at the non-operation time of the computer main body 11. Incidentally, the above-stated filter 139 is not an essential element.

A power supply state changing portion (IC) 150 is an integrated circuit constituted by including a switch 152 changing the power supply V and the USB connector 140 to a connection state or a non-connection state, and it is constituted to be able to change the switch 152 to either one of the connection state or the non-connection state. The switches 152 are provided by each USB connector 140 being the independent controlled object or by each set thereof. When the switch 152 of the power supply state changing portion 150 is changed to the connection state, the power from the power supply V is supplied to the USB device 200 via the USB connector 140. On the other hand, when the switch 152 of the power supply state changing portion 150 is changed to the non-connection state, the power from the power supply V is not supplied to the USB device 200. Incidentally, the power supply V is a battery being a rechargeable battery disposed inside the computer main body 11 and a general commercial power supply supplied from outside of the computer main body 11. Accordingly, the switch 152 is constituted to be able to change to any one of the connection state in which the USB connector 140 is connected to the battery, the connection state in which the USB connector 140 is connected to the general commercial power supply, a state in which the above-stated connection states are combined, and the non-connection state in which the USB connector 140 is not connected to either of the power supply. The power supply state changing portion 150 is constituted while including a circuit detecting that overcurrent is flowing in the respective switches 152, and outputs a detection signal 156 of the overcurrent.

A power supply state control portion (EC) 160 is an embedded controller performing a control changing the switch 152 of the power supply state changing portion 150 to either one of the connection state or the non-connection state. The power supply state control portion 160 is constituted by, for example, a one-chip microcomputer and so on, and outputs a signal 154 to control the power supply state changing portion 150. The power is supplied to the power supply state control portion 160 even at the non-operation time of the personal computer 10, and the power supply state control portion 160 is constantly in an operational state. User setting information set by the user concerning a control method of the power supply state changing portion 150 is stored in a memory housed in the power supply state control portion 160. The power supply state control portion 160 performs a control changing the switch 152 to either one of the connection state or the non-connection state in accordance with the user setting information at the non-operation time of the computer main body 11.

FIG. 4 shows an example of a setting screen to set the user setting information provided by utility software. The video controller 114 displays the setting screen shown in FIG. 4 on the LCD 17. Contents of control items set by the user are displayed at left-hand columns of the setting screen. Each of the USB connectors 140 provided at the personal computer 10 are displayed at top columns of the setting screen. Here, a USB connector 1 and a USB connector 2 respectively are the one in which one USB connector is managed as one independent controlled object, and the user can set the control items as for each of the USB connectors. Besides, a USB connector 3 and a USB connector 4 are the one in which a set constituted by the two USB connectors is managed as one independent controlled object, and the user can set the control items as for the set of the USB connectors. The user checks check boxes, or inputs a numeric value, and thereby, respective control items are arbitrary set by the user.

Figure 5:
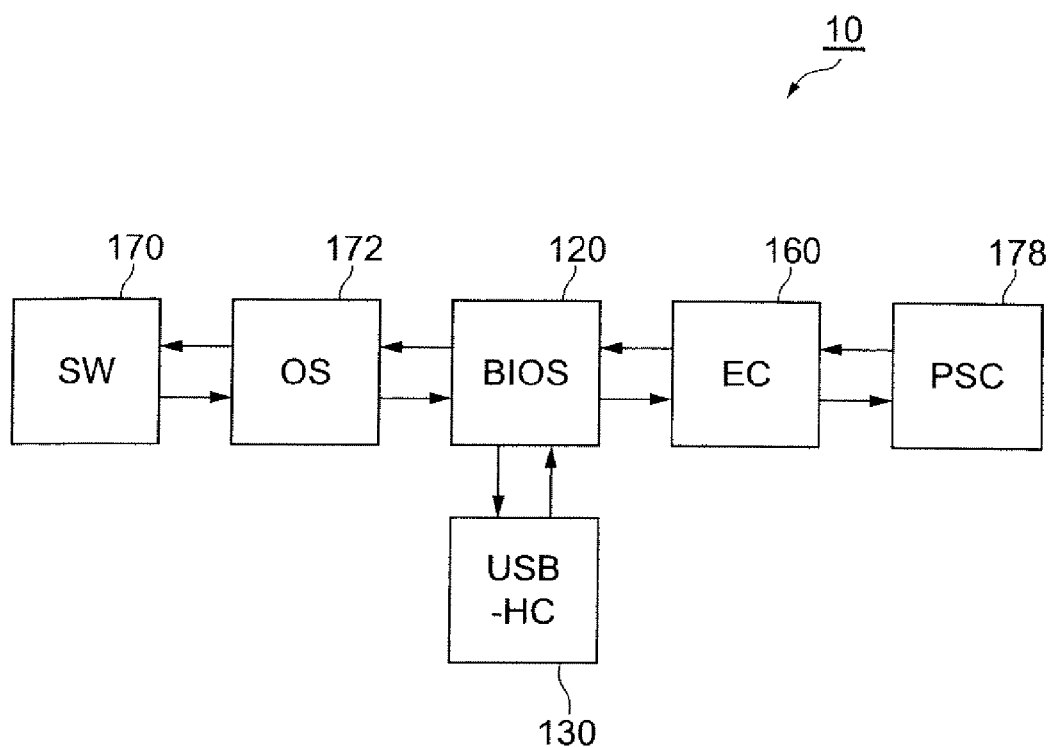
FIG. 5 is an exemplary block diagram conceptually showing a transmission path of the user setting information in the embodiment.

FIG. 5 conceptually shows a transmission path of the user setting information. The transmission path of the user setting information is hierarchical, and includes utility software (SW) 170, an operating system (OS) 172, the BIOS 120, the USB host controller (USB-HC) 130, the power supply state control portion (EC) 160 and a power supply controller (PSC) 178. Respective hierarchies of the transmission path of the user setting information are capable of exchanging information with each other.

There are items concerning a power supply control and a communication line control in the control items capable of being set by the user. When the user inputs the user setting information concerning the power supply control by using the setting screen, the user setting information is passed from the utility software 170 to the power supply state control portion 160 via the operating system 172 and the BIOS 120. The power is supply state control portion 160 stores the user setting information in the memory and consolidates a management of the user setting information.

On the other hand, when the user inputs the user setting information concerning the communication line by using the setting screen, the user setting information is passed from the utility software 170 to the USB host controller 130 via the operating system 172 and the BIOS 120. The USB host controller 130 stores the user setting information in the memory and consolidates a management of the user setting information.

The power is supplied to the respective hierarchies of the transmission path of the user setting information in the operation state of the personal computer 10. On the other hand, the power is not supplied to the utility software 170, the operating system 172 and the BIOS 120, and the power is supplied to the power supply state control portion 160, the power supply controller 178 and the USB host controller 130, in the non-operation state of the personal computer 10. Accordingly, the setting of the user setting information is performed at the operation time of the personal computer 10.

Incidentally, when the user setting information is stored in the USB host controller 130, it is necessary that the storing is performed just before the personal computer 10 performs a state transition from the operation state to the non-operation state, in other words, after the control of the personal computer 10 is passed from the operating system 172 to the BIOS 120, so as not to disturb a normal operation of the personal computer 10 at the operation time.

According to the present embodiment, the power is supplied to the USB device 200 in accordance with the user setting information at the non-operation time of the personal computer 10, and therefore, it is possible for the user to arbitrary determine a power supply function to the USB device 200. Accordingly, it is possible to make the power supply function of the personal computer 10 easy to use for the user. Besides, the power supply function of the personal computer 10 is set in detail by setting the plural control items in combination, and thereby, it becomes possible to make it easier to use for the user.

Incidentally, it is supplementary described that the power supply controller 178 is a control portion performing a general control concerning the power supply. The power supply controller 178 has a function to charge the power from the general commercial power supply to the battery when the general commercial power supply is supplied to the computer main body 11. Besides, the power supply controller 178 constantly monitors presence/absence of the power supply from the general commercial power supply, and has a function to detect whether the general commercial power supply is supplied to the computer main body 11 or not. Besides, the power supply controller 178 constantly monitors a residual capacity of the battery, and has a function to detect the residual capacity of the battery. Besides, the power supply controller 178 outputs the above-stated detected results to the power supply state control portion 160.

Various items are conceivable as the setting items set by the user, but in the personal computer 10 of the present embodiment, it is possible for the user to set the setting items shown in FIG. 4. Hereinafter, the setting items of the setting screen in. FIG. 4 are described in descending order.

A first setting item is a setting item to set whether the power is supplied via the USB connector 140 or not at the non-operation time of the personal computer 10. In other words, the first setting item is the setting item to set whether the switch 152 of the power supply state changing portion 150 is set to be the connection state or the non-connection state at the non-operation time of the personal computer 10. The user setting information generated by the utility software as for this setting item is the user setting information concerning the power supply control, and it is passed to the power supply state control portion 160 to be stored. The power supply state control portion 160 controls to connect the switch 152 of the power supply state changing portion 150 when the connection state of the switch 152 is selected in the user setting information at the non-operation time of the personal computer 10. On the other hand, the power supply state control portion 160 controls not to connect the switch 152 of the power supply state changing portion 150 when the non-connection state of the switch 152 is selected in the user setting information.

A second setting item is a setting item to select the power supply supplying the power to the USB device 200 at the non-operation time of the personal computer 10. In other words, the second setting item is the setting item to set whether the power of the general commercial power supply is supplied to the USB device 200, or the power of the battery is supplied to the USB device 200 The user setting information generated by the utility software as for this setting item is the user setting information concerning the power supply control, and it is passed to the power supply state control portion 160 to be stored. The power supply state control portion 160 controls to connect the switch 152 of the power supply state changing portion 150 to the general commercial power supply when the general commercial power supply is selected in the user setting information at the non-operation time of the personal computer 10. On the other hand, the power supply state control portion 160 controls to connect the switch 152 of the power supply state changing portion 150 to the battery when the battery is selected in the user setting information. For example, when the power is supplied from the battery, it is possible to address to a battery shutoff of a cellular phone and so on by connecting the cellular phone and so on to the USB connector to obtain the power supply. Incidentally, the second setting item may be constituted such that a setting in which the power of the general commercial power supply and the power of the battery are supplied to the USB device 200 is possible.

A third setting item is a setting item to set a minimum value of a residual capacity of the battery being a power supply condition, when the power is supplied from the battery at the non-operation time of the personal computer 10. The user setting information generated by the utility software as for this setting item is the user setting information concerning the power supply control, and it is passed to the power supply state control portion 160 to be stored. The power supply state control portion 160 controls the switch 152 of the power supply state changing portion 150 in accordance with the user setting information showing a setting value of the residual capacity of the battery at the non-operation time of the personal computer 10. Namely, the power supply state control portion 160 supplies the power from the battery to the USB device 200 when the residual capacity of the battery is above the above-stated setting value. On the other hand, when the residual capacity of the battery is below the above-stated setting value, the power is not supplied from the battery to the USB device 200.

A fourth setting item is a setting item to set whether a wake-up function is set to be a valid state or an invalid state at the non-operation time of the personal computer 10. Here, the wake-up function is a function expressed as "bring the computer out of standby" and so on in the operating system such as Windows XP provided by Microsoft Co., LTD., and it is a state transition function of the personal computer 10 releasing the non-operation state defined as "Sleeping states (S3/S4/S5 and so on)" in an "Advanced Configuration and Power Interface (ACPI) standard" to return to the operation state (SO). The user setting information generated by the utility software as for this setting item is the user setting information concerning the communication line control, and it is passed to the USB host controller 130 to be stored. The USB host controller 130 shifts the personal computer 10 from the non-operation state to the operation state in accordance with an event such as the connection of the USB device 200 when the valid state of the wake-up function is selected in the user setting information, at the non-operation time of the personal computer 10. On the other hand, the USB host controller 130 maintains the personal computer 10 in the non-operation state when the invalid state of the wake-up function is selected in the user setting information.

A fifth setting item is a setting item to set an electric potential level of the communication line for a transmission/reception of signals at the non-operation time of the personal computer 10. In other words, the fifth setting item is the setting item to set whether the electric potential level of the communication line for the transmission/reception of signals is set at a high electric potential level or at a low electric potential level at the non-operation time of the personal computer 10. The user setting information generated by the utility software as for this setting item is the user setting information concerning the communication line control, and it is passed to the USB host controller 130 to be stored. The USB host controller 130 controls the communication line to be at the high electric potential level when the high electric potential level is selected in the user setting information at the non-operation time of the personal computer 10. On the other hand, the USB host controller 130 controls the communication line to be at the low electric potential level when the low electric potential level is selected in the user setting information.

In the above-stated embodiment, a USB device is connected to a computer main body, but in another embodiment, a device complying with another standard such as IEEE1394 may be connected to the computer main body.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An information processing apparatus, comprising:
   an information processing apparatus main body receiving a supply of power from power supplies disposed at outside or inside;
   one or a plurality of connection connector(s) constituted to be able to attach/detach an external apparatus, and including at least one signal terminal transmitting/receiving signals between said information processing apparatus main body and the external apparatus and at least one power terminal supplying power from the power supplies to the external apparatus;
   a power supply state changing portion including a switch provided between the power supply and the power terminal, and capable of changing the switch to either one of a connection state or a non-connection state; and
   a power supply state control portion having user setting information set by a user concerning a control method of said power supply state changing portion, and performing a control to change the switch to either one of the connection state or the non-connection state in accordance with the user setting information at the non-operation time of said information processing apparatus main body.

2. The information processing apparatus according to claim 1,
   wherein said power supply state control portion stores information selecting whether a state in which the supply of power from the power supply is to be received or not as the user setting information, and performs a control to change the switch to be the state selected by the user setting information.

3. The information processing apparatus according to claim 1,
   wherein said power supply state control portion stores information specifying the power supply selected from the plural power supplies as the user setting information, and performs a control to change the switch to receive the supply of power from the power supply selected by the user setting information.

4. The information processing apparatus according to claim 1,
   wherein said power supply state control portion stores information of a setting value of a residual capacity as the user setting information when the power supply supplying the power to the external apparatus is a rechargeable battery, performs a control to change the switch to receive the supply of power from the power supply when the residual capacity of the power supply is above the setting value, and performs a control to change the switch not to receive the supply of power from the power supply when the residual capacity of the power supply is below the setting value.

5. The information processing apparatus according to claim 1, further comprising:
   an external apparatus control portion having user setting information set by a user concerning a control method of a communication line for a transmission/reception of signals between the external apparatus, and performing a control of the communication line in accordance with the user setting information at the non-operation time of said information processing apparatus main body.

6. The information processing apparatus according to claim 5,
   wherein said external apparatus control portion stores information selecting either one of a valid state or an invalid state of a wake-up function as the user setting information, and performs a control such that the wake-up function is to be the state selected by the user setting information.

7. The information processing apparatus according to claim 5,
wherein said external apparatus control portion stores information selecting an electric potential level of the communication line as the user setting information, and controls the communication line to be the electric potential level selected by the user setting information.

8. The information processing apparatus according to claim 1,
wherein at least one of said power supply state control portion or said external apparatus control portion stores the user setting information by said each connection connector, or by each set constituted by said plurality of connection connectors.

9. The information processing apparatus according to claim 1,
wherein said power supply state control portion performs a control to change the switch to the non-connection state when current from the power supply is overcurrent.

10. The information processing apparatus according to claim 1, further comprising:
a display portion displaying a setting screen for the user to set the user setting information, and
wherein at least one of said power supply state control portion or said external apparatus control portion stores the user setting information set by the user by using the setting screen.

* * * * *